United States Patent [19]

Spollen

[11] 4,103,104
[45] Jul. 25, 1978

[54] ANCHOR ASSEMBLY FOR A SUBMARINE CABLE COUPLING

[75] Inventor: Francis Joseph Spollen, Middletown Township, Monmouth County, N.J.

[73] Assignee: Bell Telephone Laboratories, Incorporated, Murray Hill, N.J.

[21] Appl. No.: 815,601

[22] Filed: Jul. 14, 1977

[51] Int. Cl.² .............................................. H02G 15/14
[52] U.S. Cl. ..................................................... 174/70 S
[58] Field of Search .................. 174/70 S, 88 C, 75 C

[56] References Cited

U.S. PATENT DOCUMENTS

| 2,671,127 | 3/1954 | Hope | 174/88 C |
|---|---|---|---|
| 3,780,210 | 12/1973 | Rocton | 174/70 S |

*Primary Examiner*—Thomas J. Kozma
*Attorney, Agent, or Firm*—Burton I. Levine

[57] ABSTRACT

A high-strength, electrically matched and constructionally simple anchor assembly is provided within a cable-repeater coupling for securing the front end of a submarine cable inner conductor within the coupling. The anchor member of the assembly includes a pair of centrally apertured, axially abutting discs formed from reinforced glass fibers, together with a metallic disc-like nut that abuts the front surface of the front-most disc. The stranded cable inner conductor terminates short of the discs, and is crimped within the rear end of a tube that extends through central apertures of the discs and which is affixed to the nut at its front end. The composite nut-disc member is embedded in a load-bearing cylindrical polyethylene body that is in turn captured within the anchor housing of the coupling.

7 Claims, 2 Drawing Figures

ANCHOR ASSEMBLY FOR A SUBMARINE CABLE COUPLING

BACKGROUND OF THE INVENTION

The invention relates to cable-repeater couplings, and more particularly to anchor assemblies within such couplings for securing the front end of a submarine cable inner conductor within the coupling.

As is well known, cable-repeater couplings in a repeatered submarine cable system have the job of providing both an electrical and a mechanical interface between the front end of a cable section and the next-succeeding repeater. Mechanically, this involves providing a secure, stress-resistant termination of the cable at the coupling; and for this purpose it is customary to terminate the stranded front end of the cable inner conductor within an anchor assembly. Such assembly typically includes an anchor element embedded within a polyethylene jacket that is surrounded by and in contact with an outer metallic anchor housing of the coupling. The configuration of the anchor assembly is ideally arranged to provide a good impedance match of the coupling to the cable and the repeater.

One problem with existing anchor assemblies of this type is that they are relatively complicated and expensive to manufacture. In one typical scheme, for example, the stranded front end of the cable section is received within a forwardly flanged metallic cone, which is surrounded by a doubly tapered conical ceramic member that is beveled at its front end to engage the flanged cone. The ceramic member is embedded in a knob-shaped polyethylene molding that contacts the housing.

SUMMARY OF THE INVENTION

The present invention contemplates, for use in a cable-repeater coupling of the general type indicated above, an anchor assembly that provides satisfactory mechanical and electrical characteristics in a far less expensive and structurally complicated manner than prior art designs.

In an illustrative embodiment, the anchor assembly includes a pair of insulating discs coaxial with the inner conductor of the cable and disposed in axially abutting relation. The discs have aligned central apertures for receiving a conductive rod which extends rearwardly from a metallic disc-like nut coaxially abutting the front surface of the front-most disc. The rod terminates in a crimp tube rearwardly of the rear most disc for securing the front end of the stranded cable inner conductor.

The flange-disc anchor member is encapsulated within a surrounding conductive anchor housing of the coupling by means of a cylindrical dielectric support section to complete the anchor assembly.

The insulating discs of the anchor member may be formed from reinforced glass fibers oriented in substantially parallel relation in a plane perpendicular to the disc axis. Preferably, the discs are so arranged that the fibers therein are oriented in mutually perpendicular directions.

BRIEF DESCRIPTION OF THE DRAWING

The invention is further set forth in the following detailed description taken in conjunction with the appended drawing, in which.

DETAILED DESCRIPTION

Figure 1:
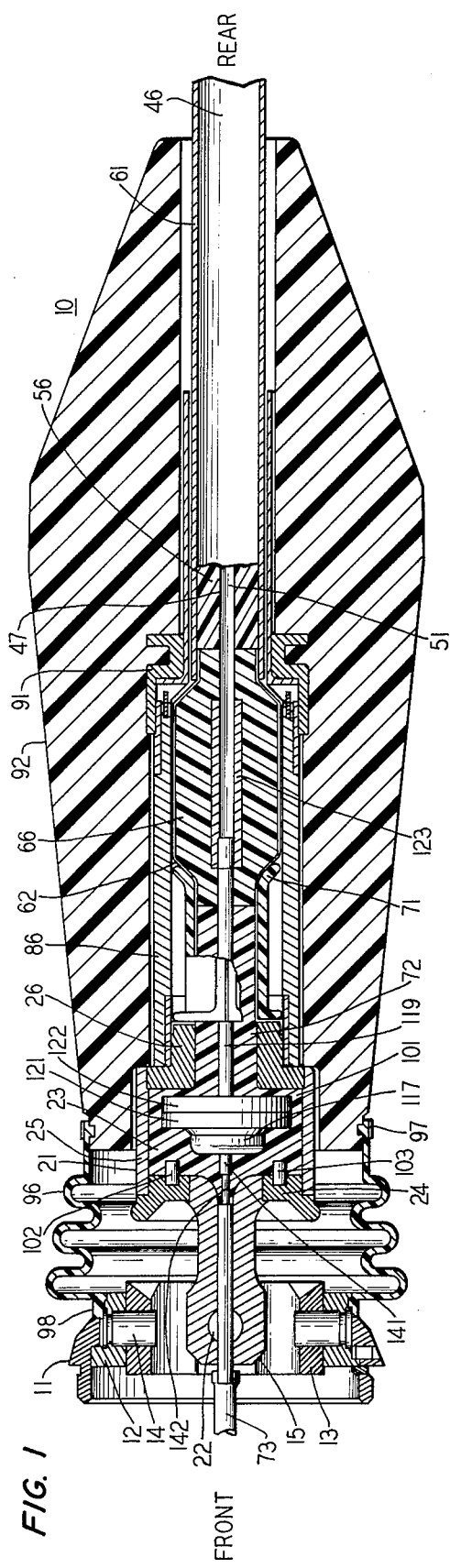
FIG. 1 is a longitudinal section, partly broken away, of a cable-repeater coupling employing an anchor assembly constructed in accordance with the invention.

Referring now to the drawing, FIG. 1 illustrates a submarine cable coupling 10 which is arranged to interface at its front end with an ocean cable repeater (not shown) through a clamp ring 11. The clamp ring 11 surrounds a gimbal housing 12, which carries a gimbal ring via a pair of diametrically arranged gimbal pins 14. A hollow boss 15 forming the front end of a conductive anchor housing 21 is in turn carried by the ring 13 via a second pair of gimbal pins 22 (one of which is shown) disposed at right angles to the pins 14.

The housing 21, which surrounds and supports an anchor assembly 23 to be described in detail below, also includes an annular front flange member 24. The member 24 has a radially inner surface that is threadedly connected to the rear surface of the boss 15. The radially outer surface of the flange member 24 is associated with the front end of a cylindrical sleeve 25. A threaded rear end of the sleeve 25 engages a correspondingly threaded front surface of a rearwardly projecting hollow end piece 26.

A front end of a submarine coaxial cable section 46 is terminated in the coupling 10 for mechanical and electrical connection to the repeater. The cable section 46 has an inner conductor 47 consisting of an inner stranded steel strength member 51 surrounded by a metallic tubular jacket (not shown). The cable further includes a solid dielectric core 56, illustratively of polyethylene, which surrounds the inner conductor.

A jacketed outer conductor 61 surrounds the dielectric core 56. The front end of the conductor 61 is conductively extended within the coupling 10 in a contoured tubular insert 62, which is carried on the outer surface of a dielectric member 66. The front end of the insert 62 extends over the end piece 26 of the housing 21 and is crimped against it by a dielectric clamp 71.

The front end of the cable core 56 terminates in abutting relation to the rear end of the dielectric member 66, which in turn bears against the rear surface of a hollow dielectric support portion 72 of the anchor assembly 23. The support portion 72 serves to provide dielectric continuity between the core 56 and the dielectric of a coaxial pigtail lead 73 of the repeater. The inner conductor of the lead 73 extends axially through the boss 15 of the anchor housing 21.

A support tube 86 surrounds the conductive insert 62 within the coupling 10, and is secured at its front end to the end piece 26 of the anchor housing 21. At its rear end, the tube 86 is threaded to a boot frame 91, which is embedded within a heavy protective rubber boot 92. The rear end of a flexible bellows 96, made of rubber or the like, is secured by a strap 97 to the front end of the boot 92. The front end of the bellows 96 is correspondingly secured by means of a strap 98 to an outer flange of the gimbal housing 12.

The purpose of the anchor assembly 23 is to securely terminate the front end of the stranded strength member 51 within the coupling 10, as well as to provide electrical continuity from cable 46 to the repeater with a minimum of return loss. In accordance with the invention, the anchor assembly 23 is constructed in a much simpler and more efficient manner than corresponding assemblies of the prior art without sacrificing the desired mechanical strength. In addition, the assembly 23 has been found to have improved electrical characteristics.

In particular, the dielectric support portion 72 includes a hollow cylindrical region 101, whose radially outer surface is in contact with the inner surface of the sleeve 25 of the housing 21. The front and rear surfaces, respectively, of the region 101 are in engagement with the radial flange member 24 and the end piece 26 of the housing 21. A pair of connecting pins 102, 103 serve to angularly secure the region 101 within the housing.

The hollow interior of the region 101 is locally widened to accommodate a metallic disc-like nut 117. The nut 117 has a threaded central aperture (not shown) for receiving a corresponding threaded front end of a conductive rod 119. The rod 119 extends rearwardly from the nut 117 through aligned central apertures of a pair of axially abutting insulating discs 121, 122 also disposed within the region 101. A hollow conductive crimp tube 123 is securely carried by the rear end of the rod 119 for tightly receiving the exposed front end of the stranded cable strength member 51. Illustratively, the tube 123 is threadedly attached to the rear end of rod 119.

A conductive boss 141 extends forwardly from the front surface of the rod 119 within the hollow interior of the dielectric region 101. Such boss terminates in a conductive rod 142, which in turn is adapted for conductive connection to the inner conductor of the repeater pigtail lead 73.

The conductive nut 117 forms, with the insulating discs 121 and 122 and the conductive rod-crimp tube assembly 119, 123, a composite metal-dielectric anchor member wherein the nut compensates the impedance presented by the discs 121, 122 to wave energy propagating through the coupling 10.

Figure 2:
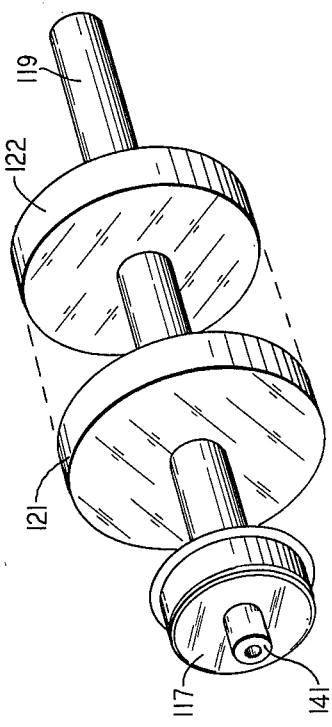
FIG. 2 is an exploded view of a composite metal-dielectric anchor member suitable for use in the anchor assembly of FIG. 1.

An exploded view of the nut 117, the discs 121 and 122, and the projecting rod 119, is indicated in FIG. 2. Each of the discs 121 and 122 is illustratively formed from pultruded glass fiber stock which has been suitably reinforced by a plastic such as polyethylene. The fibers in each disc extend parallel to each other in a plane perpendicular to the disc axis. The fiber orientation in the rear disc 122 is preferably at right angles to the fiber orientation of the disc 121 as shown; such cross-orientation of the fibers in the abutting discs has been found to increase the mechanical strength of the overall anchor assembly 23.

The above-described configuration of the composite flange-disc anchor member, and of the associated central region 101 of the load-bearing dielectric support portion 72 captured within the anchor housing 21, provides a relatively inexpensive and easily manufactured anchor assembly without sacrifice of the necessary mechanical and electrical characteristics. In addition, the use of the rearwardly projecting rod 119 and crimp tube 123 for the actual securing of the incoming cable section to the anchor assembly further simplifies the construction by eliminating the necessity of terminating the stranded inner conductor within the enlarged central portion of the anchor member inside the housing 21 itself.

In the foregoing, an illustrative arrangement of the invention has been described. Many variations and modifications will now occur to those skilled in the art. It is accordingly desired that the scope of the intended claims not be limited to the specific disclosure herein contained.

What is claimed is:

1. In a coupling between a repeater and a front end of a submarine cable, an improved arrangement for terminating the front end of the cable inner conductor within the coupling, which comprises:

anchor means comprising, in combination, front and rear discs disposed in axially abutting relation and having aligned central apertures extending axially therethrough, each of the discs being formed from a first insulating material, an elongated conductive element extending coaxially through the central apertures of the discs for receiving the front end of the inner conductor, and a conductive nut coaxially secured to the front end of the conductive element and having a rear surface abutting the front surface of the front disc; and means disposed in surrounding relation to the discs and the nut for encapsulating the anchor means within the coupling.

2. The improvement as defined in claim 1, in which the encapsulating means comprises a hollow cylindrical body formed from a second insulating material.

3. The improvement as defined in claim 1, in which the front end of the cable inner conductor terminates rearwardly of the rear surface of the rear disc, and in which the rear end of the conductive element extends rearwardling beyond the rear surface of the rear disc to receive the front end of the inner conductor.

4. The improvement as defined in claim 1, in which the first insulating material is reinforced fibrous glass.

5. The improvement as defined in claim 4, in which the reinforced glass fibers of each disc are oriented in substantially parallel relation in a plane perpendicular to the disc axis.

6. The improvement as defined in claim 5, in which the direction of fiber orientation of the front disc is substantially perpendicular to the direction of fiber orientation of the rear disc.

7. The improvement as defined in claim 1, in which the second insulating material is polyethylene.

* * * * *